United States Patent [19]

Miller

[11] Patent Number: 4,463,304
[45] Date of Patent: Jul. 31, 1984

[54] HIGH VOLTAGE MOTOR CONTROL CIRCUIT

[75] Inventor: Thomas A. Miller, Bluffton, Ind.

[73] Assignee: Franklin Electric Co., Inc., Bluffton, Ind.

[21] Appl. No.: 402,083

[22] Filed: Jul. 26, 1982

[51] Int. Cl.³ .............................................. H02P 1/44
[52] U.S. Cl. .................................... 318/790; 318/786
[58] Field of Search ............... 318/787, 786, 789, 790, 318/785, 781

[56] References Cited

U.S. PATENT DOCUMENTS

| | | | |
|---|---|---|---|
| 3,573,579 | 4/1971 | Lewus | 318/787 |
| 3,766,457 | 10/1973 | Fink | 318/786 |
| 3,916,274 | 10/1975 | Lewus | 318/787 |
| 3,970,908 | 7/1976 | Hansen | 318/786 |
| 4,307,327 | 12/1981 | Streater | 318/787 X |

Primary Examiner—G. Z. Rubinson
Assistant Examiner—Patrick C. Keane
Attorney, Agent, or Firm—Marshall, O'Toole, Gerstein, Murray & Bicknell

[57] ABSTRACT

This disclosure relates to a circuit for controlling energization of a start winding of a single-phase motor connectable by power lines to an AC power supply. The circuit includes at least two triacs connected in back-to-back series relation and connected in series with the start winding. The circuit further comprises a reed switch including reed contacts and a reed coil. The gates of the two triacs are connected across the reed contacts, and the reed coil is connected in one of the power lines and receives the line current during energization of the motor.

1 Claim, 4 Drawing Figures

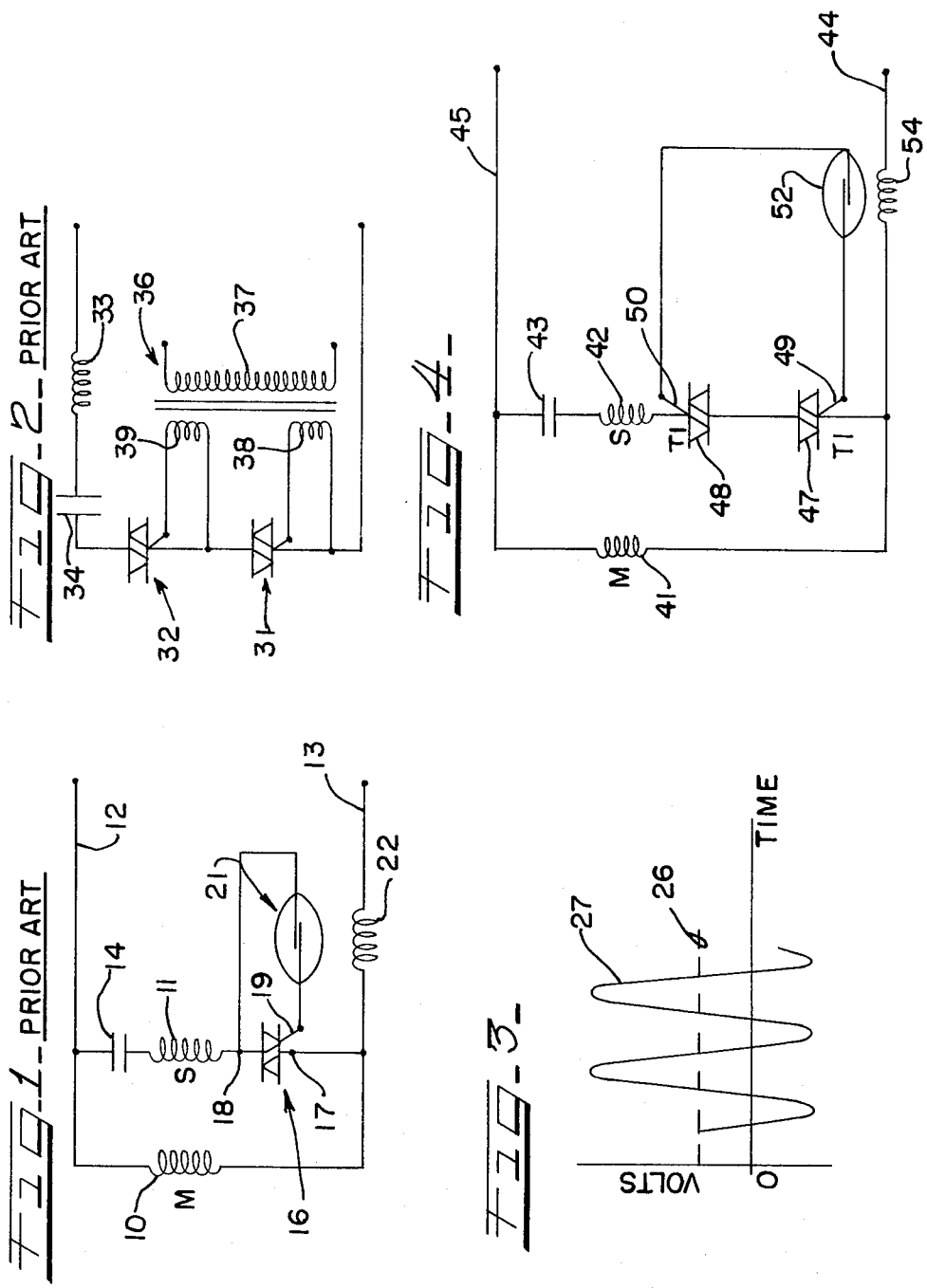

HIGH VOLTAGE MOTOR CONTROL CIRCUIT

DETAILED DESCRIPTION

This invention relates to a circuit for controlling the application of electric power to a load, particularly an inductive load such as a winding of a single phase electric motor. A single phase motor includes a main or run winding and a start winding, and a control circuit is provided to energize the start winding only at motor start up and at low motor speed conditions. In recent years many control circuits of this nature have included a solid state gateable or triggerable device such as a triac or SCRs.

U.S. Pat. Nos. 4,307,327 and 3,573,579 disclose control circuits of this character. In FIG. 1 of U.S. Pat. No. 4,307,327, the circuit includes a triac connected in series with a start winding, and a reed switch trigger is connected to the gate of the triac. When a motor including such a control circuit also includes a start capacitor connected in series with the start winding and with the triac and is connected to a 230 volt power supply, it has been found that an excessively high voltage may exist across the triac in certain operating conditions. For example, when the triac is switched off as the motor approaches running speed, the potential remaining on the start capacitor will equal the instantaneous voltage present at the time the triac is switched off. The voltage across the triac then equals the capacitor voltage plus the sinusoidally varying line voltage plus the voltage induced in the start winding, as will be discussed hereinafter in connection with FIG. 3. In a 230 volt, capacitor-start induction motor, the voltage across the triac can exceed 850 volts, and in these circumstances a triac having a rated voltage of at least 1,000 volts should be used. At the present state of this art, such triacs are not available in production quantities, and any that are available are very expensive.

It has been known that the voltage across a triac may be reduced by connecting a second triac in series with it. In a circuit including two series connected triacs as shown in FIG. 2 herein and as shown in FIG. 3 of U.S. Pat. No. 3,573,579, the voltage is divided between the two triacs, thereby effectively reducing by one-half the voltage requirement of each triac. As will be discussed in more detail in connection with FIG. 2, a disadvantage of such an arrangement is that a separate external trigger voltage source must be provided for the triacs. This requirement adds expense to the control circuit, and in an application where the control circuit must be installed within the housing of an AC motor, the space requirement for a separate trigger source is a distinct disadvantage.

It is a general object of the present invention to provide a triac control circuit for an inductive load, which is capable of withstanding the high voltages occurring in such a circuit and which does not require a separate trigger source.

A control circuit in accordance with the present invention is particularly useful with a single-phase, capacitor-start induction motor including a main winding and a start winding connected in parallel to AC power lines, and a start capacitor connected in series with the start winding. The control circuit includes at least two triacs connected in series with the start winding. The triacs are connected in back-to-back relation, and the gates of the two triacs are connected to the opposite contacts of a reed switch. The coil of the reed switch is connected in one of the power lines leading to the two windings and receives the line current. The normally-open reed contacts isolate the gates and thereby prevent the triacs from being continuously triggered. The series connection of the triacs reduces the voltage across each triac, and the inductive impedence of the start winding prevents the current through the gates from exceeding the rated gate current before the triacs are triggered on.

The invention will be better understood from the following detailed description taken in conjunction with the following figures of the drawing, wherein:

FIGS. 1 and 2 show prior art control circuits;

FIG. 3 is a curve illustrating the operation of the circuit shown in FIG. 1; and FIG. 4 is a control circuit in accordance with the present invention.

The circuit shown in FIG. 1 is essentially the same as the single-phase motor circuit shown in FIG. 1 of U.S. Pat. No. 4,307,327, with the addition of a start capacitor. The circuit shown in the present FIG. 1 includes a main winding 10 and a start winding 11 which are connected in parallel to two power lines 12 and 13. The lines 12 and 13 are adapted to be connected to a single-phase AC power supply (not shown). Connected in series with the start winding 11 are a start capacitor 14 and a triac 16. The triac 16 includes a T1 terminal 17, a T2 terminal 18, and a gate 19. The terminal 18 and the gate 19 are connected across the two contacts of a reed switch 21. The switch 21 further includes a reed coil 22 that is connected in the power line 13.

As described in detail in U.S. Pat. No. 4,307,327, during operation of the motor shown in FIG. 1, the line current flows through the reed coil 22, and the magnetic field of the coil closes the contacts of the reed switch 21. When the contacts are closed, the triac 16 is triggered into conduction. As described in the patent, the triac 16 is triggered in each half cycle of the AC supply voltage until the changing phase angle of the start winding current relative to the line current results in the triac failing to be triggered. This phase angle changes as the motor increases in speed.

With reference to FIGS. 1 and 3, at the time that the triac 16 stops conducting, the voltage across the start capacitor 14 will be equal to the instantaneous voltage that occurred at the time conduction ceased. In FIG. 3, this DC voltage is indicated by the voltage level 26. The sine wave 27 represents the varying AC wave that continues to appear across the triac 16 and it is equal to the sum of the line voltage plus the voltage induced in the start winding 11. This sine wave voltage 27 is superimposed on the DC capacitor voltage 26. In an instance where the power supply connected to the power lines 12 and 13 is 230 volts RMS, the capacitor voltage may equal approximately 300 volts (the peak voltage of the AC supply). Consequently the peak of the resultant voltage shown by the curve 27 may exceed 850 volts, and it appears across the power terminals 17 and 18 of the triac 16. The reed contacts are, of course, open at this time.

To reduce the magnitude of the voltage across the triac, a pair of triacs 31 and 32 may be connected in series relation as shown in FIG. 2 and as shown in FIG. 3 of U.S. Pat. No. 3,573,579. An inductive load 33 and a capacitor 34 are connected in series with the two triacs 31 and 32. To trigger the two triacs, a separate trigger voltage source 36 is provided, and in the example shown in the patent, the source 36 comprises a transformer including a primary winding 37 and two secondary windings 38 and 39. The windings 38 and 39 are respectively connected to the gates of the two triacs 31 and 32, and when a current pulse appears in the primary winding 37, voltages are induced in the gate circuits of the two triacs which trigger them into conduction. The two triacs, of course, fail to be triggered in the absence of a varying current in the primary winding 37. Even if the resultant voltage 27 appears across the triacs it is divided between the two triacs, and this prevents the voltage across the power terminals of each triac from being excessive. The circuit shown in FIG. 2, however, has a distinct disadvantage in that a separate trigger source must be provided for the triacs. In addition to being a substantial expense, the transformer requires considerable space and in an instance where such a control circuit is used in an AC induction motor, it would be difficult to mount it within the motor housing where limited space is available.

U.S. Pat. No. 3,573,579 also suggests, in lines 51–56, column 10, that a single secondary winding may be used in place of the separate secondary windings. Nevertheless, such an arrangement requires a separate source for the triggering voltage, and it isn't clear from the patent how such an arrangement would operate.

The circuit in accordance with this invention, shown in FIG. 4, possesses the advantages of the series connected triacs without the disadvantage of requiring a separate trigger voltage supply. The single-phase motor circuit shown in FIG. 4 includes a main winding 41, a start winding 42 and a start capacitor 43 connected across power lines 44 and 45. Two triggerable or gateable devices 47 and 48, preferably triacs, are connected in back-to-back fashion in series with the start winding 42 and the capacitor 43. The phrase "back-to-back" as used herein means that the T2 power terminals of the two triacs are connected together. The gates 49 and 50 are connected across the contacts 52 of a reed switch 53. The switch 53 further includes a reed coil 54 connected in the power line 44, and it thereby receives the line current.

During startup of the motor shown in FIG. 4, line current flows through the lines 44 and 45 and through the main winding 41 and the field of the coil 54 closes the contacts 52. Triac trigger current then flows between the line 44, the T1 terminal and the gate 49 of the triac 47, through the closed reed contacts 52, through the gate 50 and T1 terminal of the triac 48, through the winding 42 and the capacitor 43, and the power line 45. Thus, a portion of the line current flowing through the power lines 44 and 45 is utilized as the trigger current for the two triacs. This current triggers the two triacs into conduction and current then flows through the main terminals of the triacs and through the start winding 42 and the start capacitor 43. The circuit then continues in operation similar to the circuits described in U.S. Pat. No. 4,307,327. When the triacs 47 and 48 are turned off, the resultant voltage is divided substantially equally between the two triacs. If a closer equalization of the voltages across the triacs is desired, a conventional RC network may be connected in parallel with each triac.

It should be noted that the start winding current initially flows through the gate circuits of the two triacs 47 and 48 and through the reed contacts 52 immediately after the contacts 52 are closed and before the triacs are triggered into conduction. Those skilled in this art would expect that the circuit would be inoperative because this start winding current would be expected to exceed the rated gate voltages of the triacs and damage them. It is an important feature of the present invention that this does not occur because the trigger current flows through the start winding 42, and the inductance of the start winding limits the rate of rise of the trigger current during the time interval required for the triac to be triggered. The current builds up relatively slowly in the gate circuits which thereby enables the two triacs to be triggered into conduction before the gate current becomes excessive. When the triacs are triggered on, they form a low resistance path which shunts the gate circuits and thereby maintains a low gate current level. At the running speed of the motor, the phase angle is such that the contacts 52 are not closed and the triacs are not triggered, and the open contacts 52 isolate and protect the gates of the triacs.

The circuit shown in FIG. 4 does not require an additional trigger voltage supply because it utilizes the load current for triggering the triacs, and this trigger current is prevented from exceeding the rated gate circuit currents because of the inductance of the start winding 42. The safe operating region of the triacs is a function of the start winding 42 inductance, the line voltage, the turn-on time of the triacs, and the maximum permissible gate current. The start winding 42 inductance L should be at least approximately $$L = V \times (T/I)$$

where V is the applied line voltage, T is the turn-on time of the triacs, and I is the maximum allowable gate current of the triacs.

It should be apparent that a novel and useful control circuit for an inductive load has been provided. The control circuit is relatively inexpensive because it does not require triacs having a high voltage rating, and it does not require a separate trigger source.

What is claimed is:

1. A single-phase electric motor connectable to AC power supply lines having a line voltage thereon, comprising a main winding and a start winding connected in parallel and said parallel connection being adapted to be connected to the power supply lines, two substantially identical triacs each of which includes a gate, a first power terminal and a second power terminal, each triac being triggered to conduction by trigger current flow between said gate and said first power terminal, said first and second power terminals of said two triacs being connected in series with said start winding, and said second power terminals of said two triacs being connected together, the inductance of said start winding being at least as great as the line voltage times the turn-on time of said triacs divided by the maximum allowable trigger current of said triacs, a reed switch including normally open contacts and a coil, said gates being connected to opposite sides of said contacts and said triacs being triggered to conduction when said contacts are closed and trigger current flows in a series circuit including said start winding, said first power terminals, said gates and said closed contacts, and said coil being adapted to be connected to one of said supply lines and operating to open and close said contacts.

* * * * *